(12) United States Patent
Marshall et al.

(10) Patent No.: US 8,904,009 B1
(45) Date of Patent: Dec. 2, 2014

(54) DYNAMIC CONTENT DELIVERY

(75) Inventors: Bradley E. Marshall, Bainbridge Island, WA (US); Piragash Velummylum, Seattle, WA (US); Jacob Gabrielson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 267 days.

(21) Appl. No.: 13/371,207

(22) Filed: Feb. 10, 2012

(51) Int. Cl.
*G06F 15/16* (2006.01)

(52) U.S. Cl.
USPC ............ 709/226; 709/205; 709/219; 455/414

(58) Field of Classification Search
CPC ..... H04L 67/42; H04L 67/104; H04L 67/108; H04L 65/604; H04L 65/108; H04L 63/104
USPC ............................ 709/205, 219, 226; 455/414
See application file for complete search history.

(56) References Cited

U.S. PATENT DOCUMENTS

| | | | |
|---|---|---|---|
| 7,506,034 B2* | 3/2009 | Coates et al. | 709/219 |
| 8,001,187 B2* | 8/2011 | Stochosky | 709/205 |
| 8,296,393 B2* | 10/2012 | Alexander et al. | 709/217 |
| 2005/0234864 A1* | 10/2005 | Shapiro | 707/1 |
| 2005/0256880 A1* | 11/2005 | Nam Koong et al. | 707/10 |
| 2005/0266835 A1* | 12/2005 | Agrawal et al. | 455/414.3 |
| 2007/0243860 A1* | 10/2007 | Aiello et al. | 455/414.3 |
| 2009/0259588 A1* | 10/2009 | Lindsay | 705/40 |
| 2011/0196892 A1* | 8/2011 | Xia | 707/769 |
| 2012/0110515 A1* | 5/2012 | Abramoff et al. | 715/854 |

\* cited by examiner

*Primary Examiner* — Tesfay Yohannes
(74) *Attorney, Agent, or Firm* — Knobbe, Martens, Olson & Bear, LLP (57) ABSTRACT

Aspects of the present disclosure relate to the generation and delivery of content including unique and shared components. A content delivery network service provider can obtain requests for content from client computing devices. Based on information provided in the request or otherwise managed by executable code on the client computing device, the CDN service provider obtains one or more pieces of content that may be shared by more than one user or client computing devices. Additionally, the CDN service provider obtains one or more pieces of content that will not be shared by more than one user or more than one client computing device. Responsive to the content request, the CDN service provider can combine the one or more pieces of shared content and the one or more pieces of unique content and deliver the combined content to the requested client computing device.

21 Claims, 7 Drawing Sheets

DYNAMIC CONTENT DELIVERY

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN providers are also generally motivated to provide requested content to client computing devices often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service. Additionally, in embodiments in which the requested content includes personalized content, such as images, annotations, etc., CDN service providers may have limited capabilities to cache the personalized content.

BRIEF DESCRIPTION

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to the delivery of content to client devices. More specifically, aspects of the present disclosure relate to the generation and delivery of content including unique and shared components. In accordance with an illustrative embodiment, a content delivery network ("CDN") service provider can obtain requests for content from client computing devices. Based on information provided in the request or otherwise managed by executable code on the client computing device, the CDN service provider obtains one or more pieces of content that may be shared by more than one user or client computing devices. Examples can include images, videos, audio tracks, documents (e.g., text, markup language, executable code), and the like, and will generally be referred to as "shared content." Illustratively, the shared content may be associated with various access rights that specify how the content may be access, the form in which the shared content may be accessed (e.g., encryption or encoding parameters), which will be generally referred to as security parameters. Additionally, the shared content may be associated with one or more caching parameters that indicate whether the content may be cached and one or more attributes associated with how the shared content may be cached by the CDN service provider.

Additionally, the CDN service provider obtains one or more pieces of content that will not be shared by more than one user or more than one client computing device. Examples can include images, videos, audio tracks, documents (e.g., text, markup language, executable code), and will generally be referred to as "unique content." Illustratively, the unique content may also be associated with access rights, which can be different from the access rights associated with any shared content. Additionally, the unique content may also be associated with different caching parameters and may even be associated with a caching parameter that prevents caching. Responsive to the content request, the CDN service provider can combine the one or more pieces of shared content and the one or more pieces of unique content and deliver the combined content to the requested client computing device. Although various aspects of the disclosure will be described with regard to illustrative examples and embodiments, one skilled in the art will appreciate that the disclosed embodiments and examples should not be construed as limiting.

Figure 1:
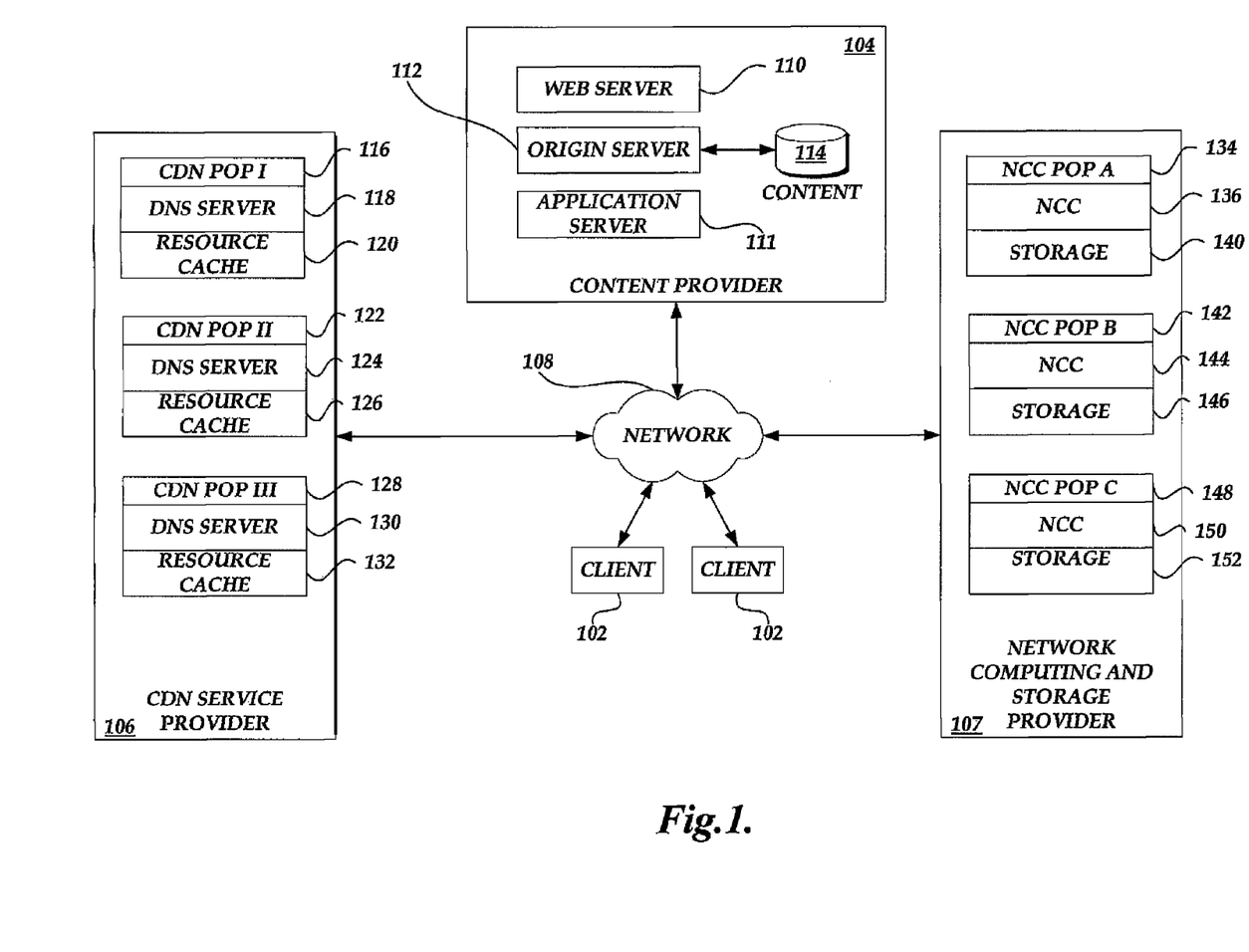
FIG. 1 is a block diagram illustrative of content delivery environment including a number of client computing devices, content provider, a content delivery network service provider, and a network computing and storage provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content provider 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN Provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network computing and storage provider 107 in communication with the one or more client computing devices 102, the CDN service provider 106, and the content provider 104 via the communication network 108. The network computing and storage provider 107 illustrated in FIG. 1 also corresponds to a logical association of one or more computing devices associated with a network computing and storage provider. Specifically, the network computing and storage provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing resources from content providers which will be processed by an instance of an NCC 136, 144, 150 and transmitted to various client computers. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. Additionally, although the NCC POPs 134, 142, 148 are illustrated in FIG. 1 as logically associated with the network computing and storage provider 107, the NCC POPs will be geographically distributed throughout the communication network 108 in a manner to best serve various demographics of client computing devices 102. Additionally, one skilled in the relevant art will appreciate that the network computing and storage provider 107 can be associated with various additional computing resources, such additional computing devices for administration of content and resources, and the like. Further, the network computing and storage provider 107 may be associated with only computing resources or only storage resources, as appropriate. Even further, one skilled in the relevant art will appreciate that the components of the network computing and storage provider 107 and components of the CDN service provider 106 can be managed by the same or different entities.

Figure 2:
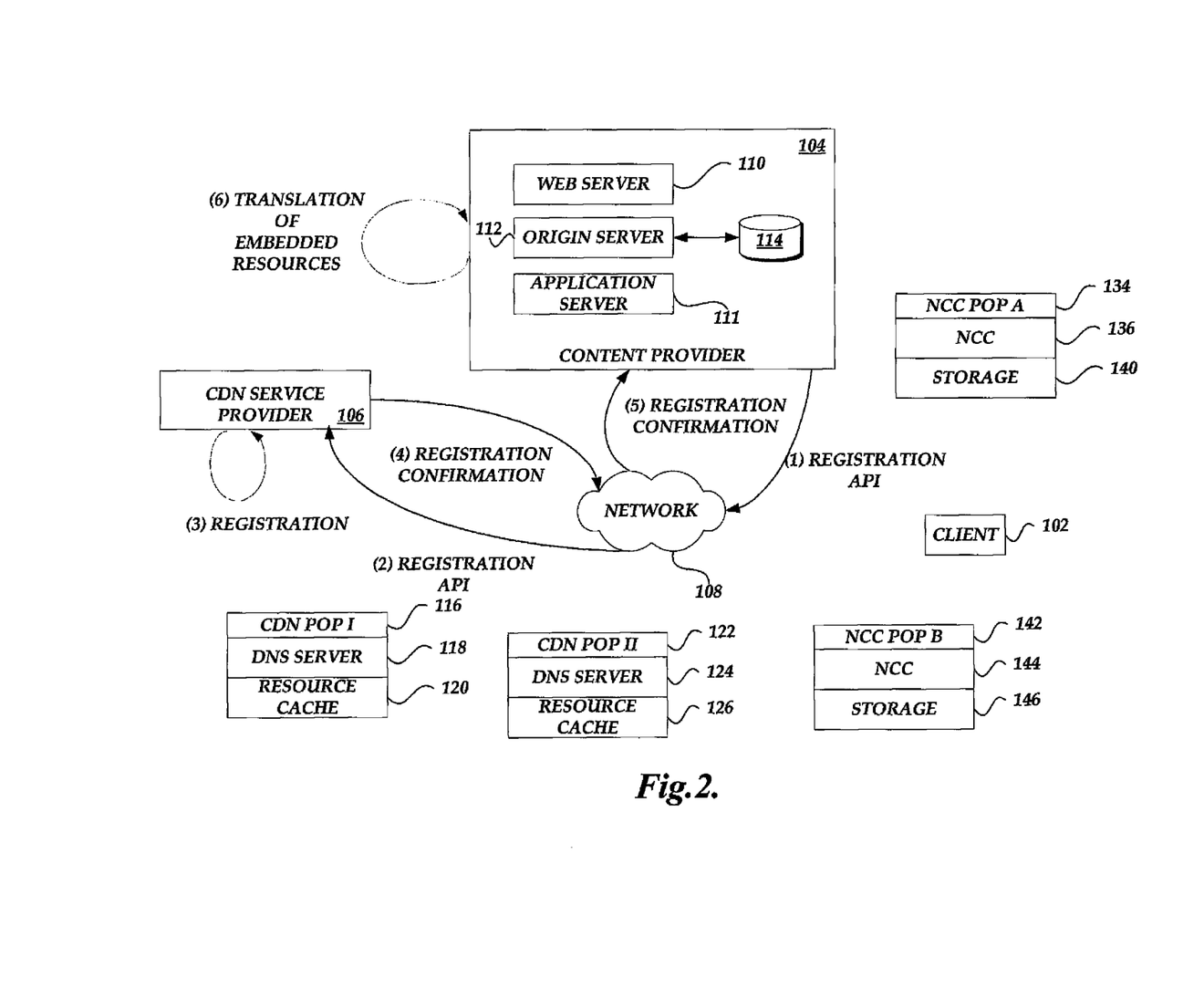
FIG. 2 is a block diagram of the content delivery environment of FIG. 1 illustrating the registration of a content provider with a content delivery service provider.
Figure 3A:
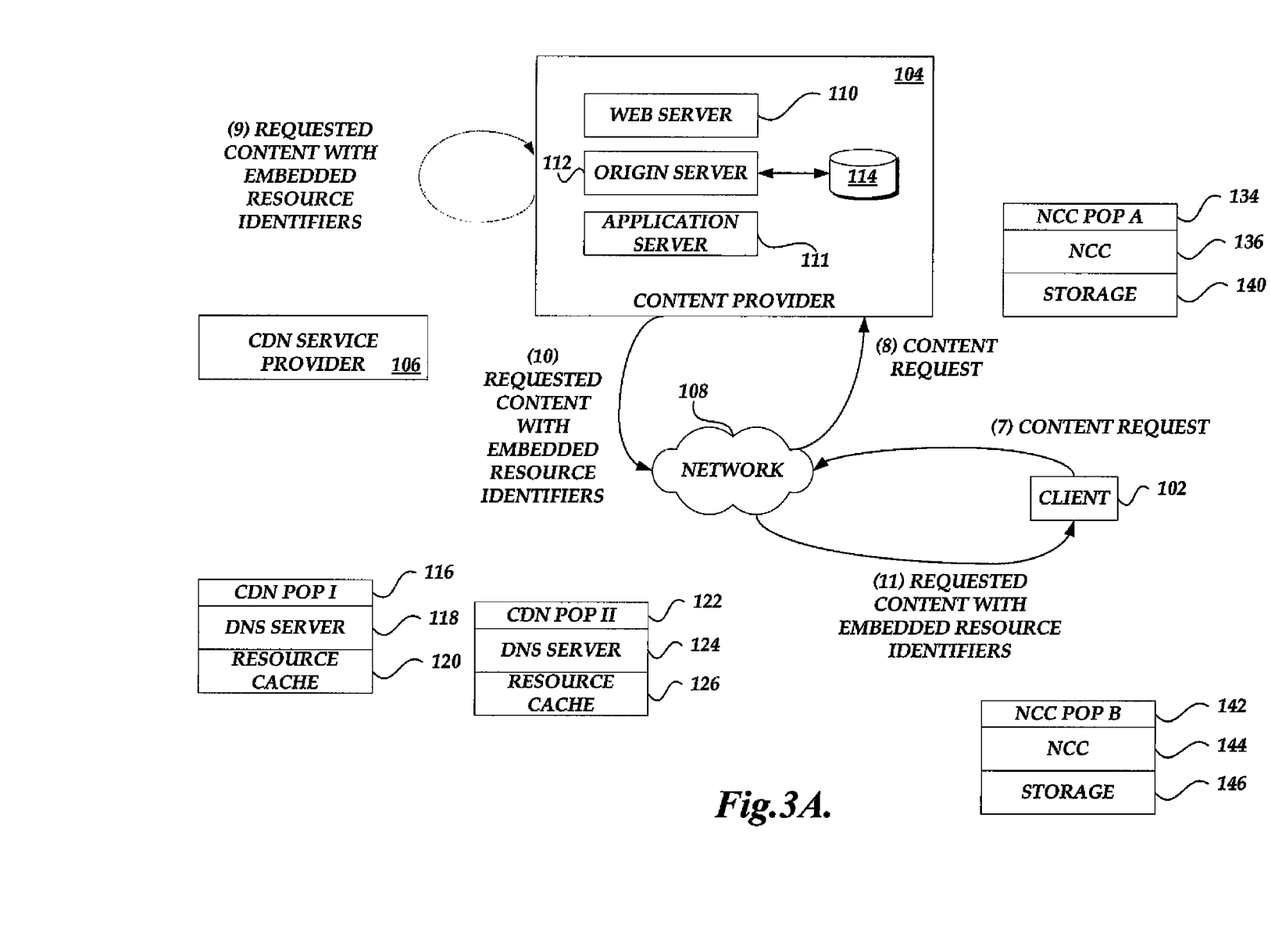
FIG. 3A is a block diagram of the content delivery environment of FIG. 1 illustrating the generation and processing of a content request from a client computing device to a content provider.
Figure 3B:
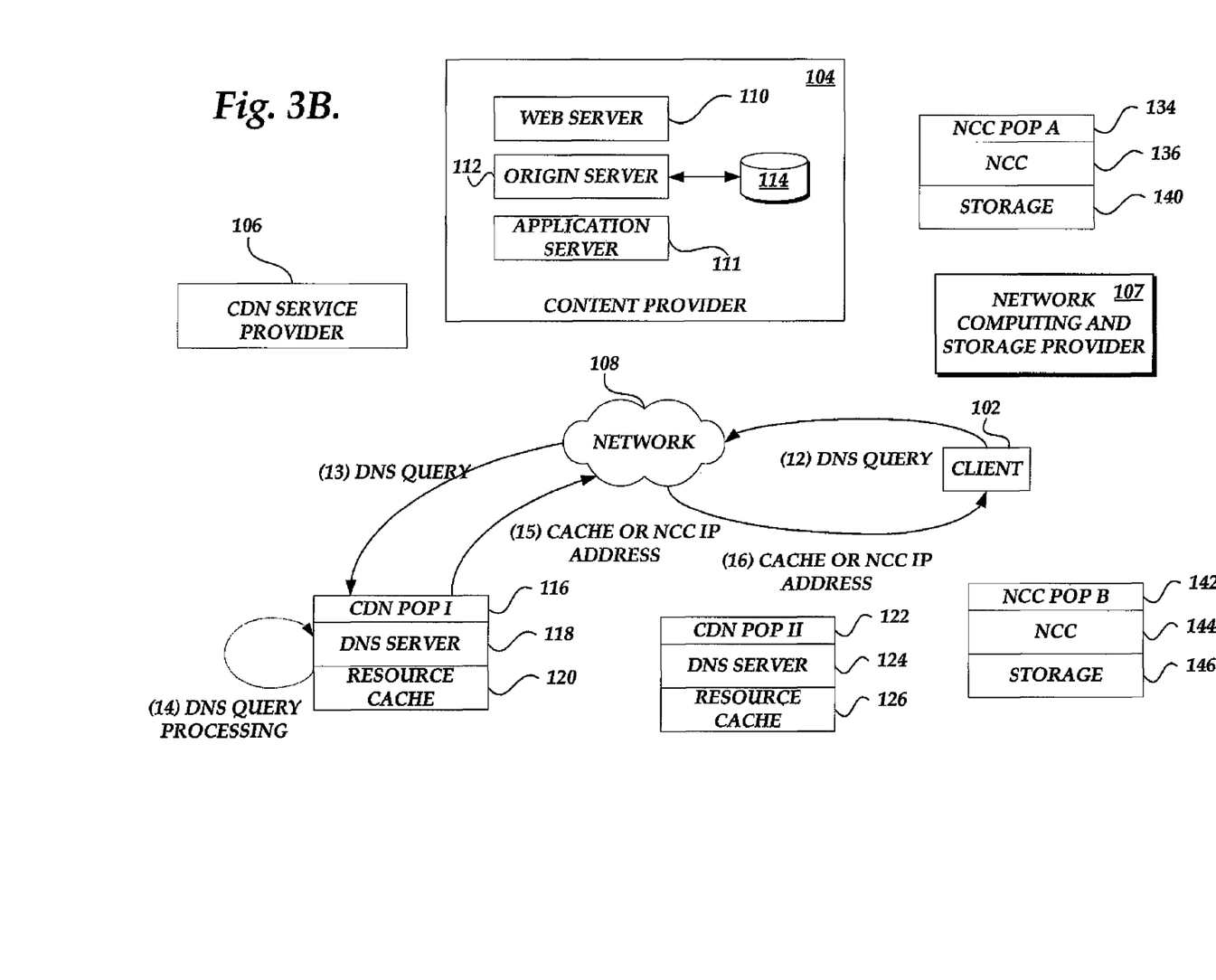
FIG. 3B is a block diagram of the content delivery environment of FIG. 1 illustrating one embodiment of the generation and processing of a DNS query corresponding to an embedded resource from a client computing device to a content delivery network service provider.
Figure 4A:
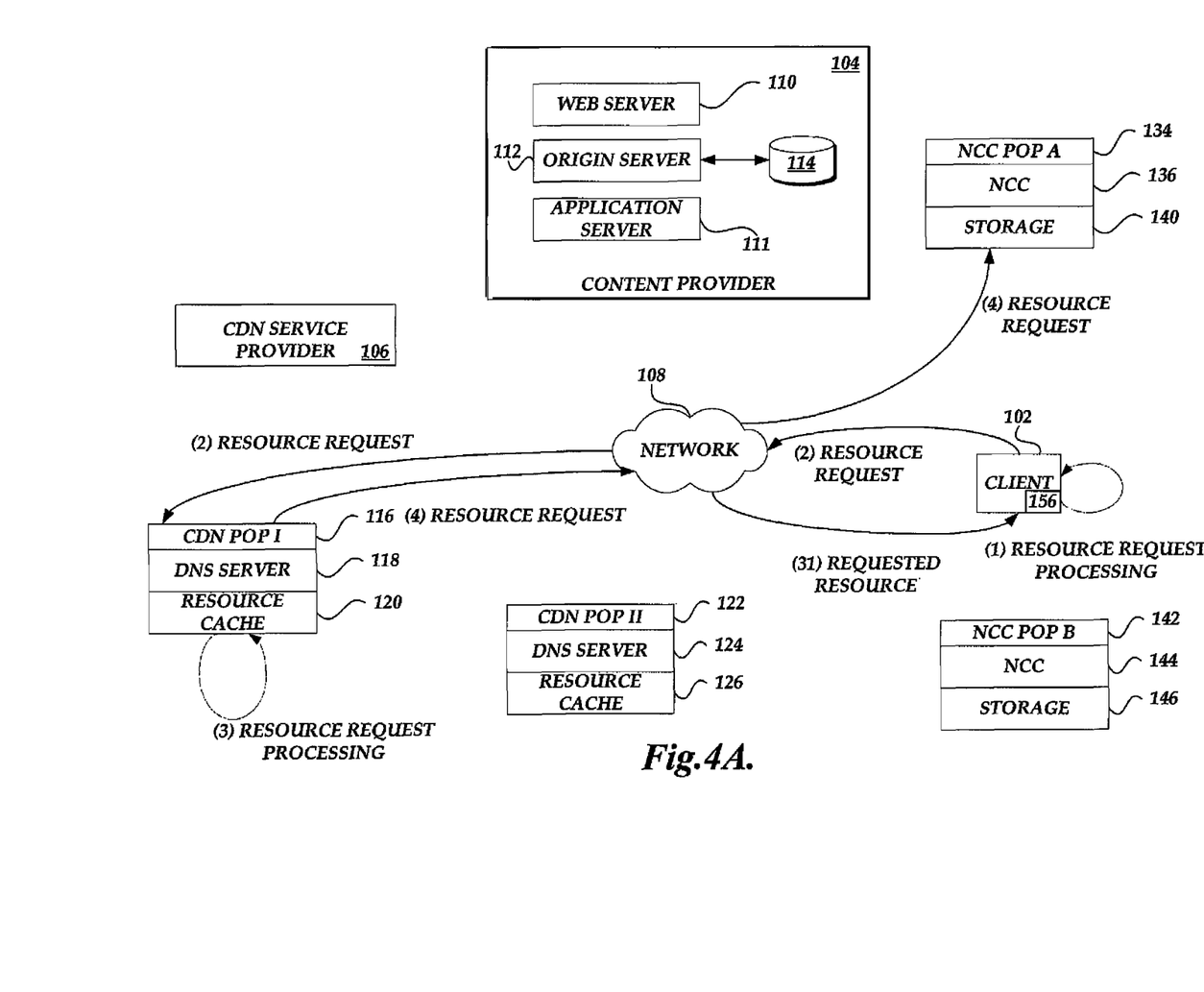
FIGS. 4A and 4B are block diagrams of the content delivery environment of FIG. 1 illustrating the generation and processing of embedded resource requests from a client computing device to a content delivery network service provider.
Figure 4B:
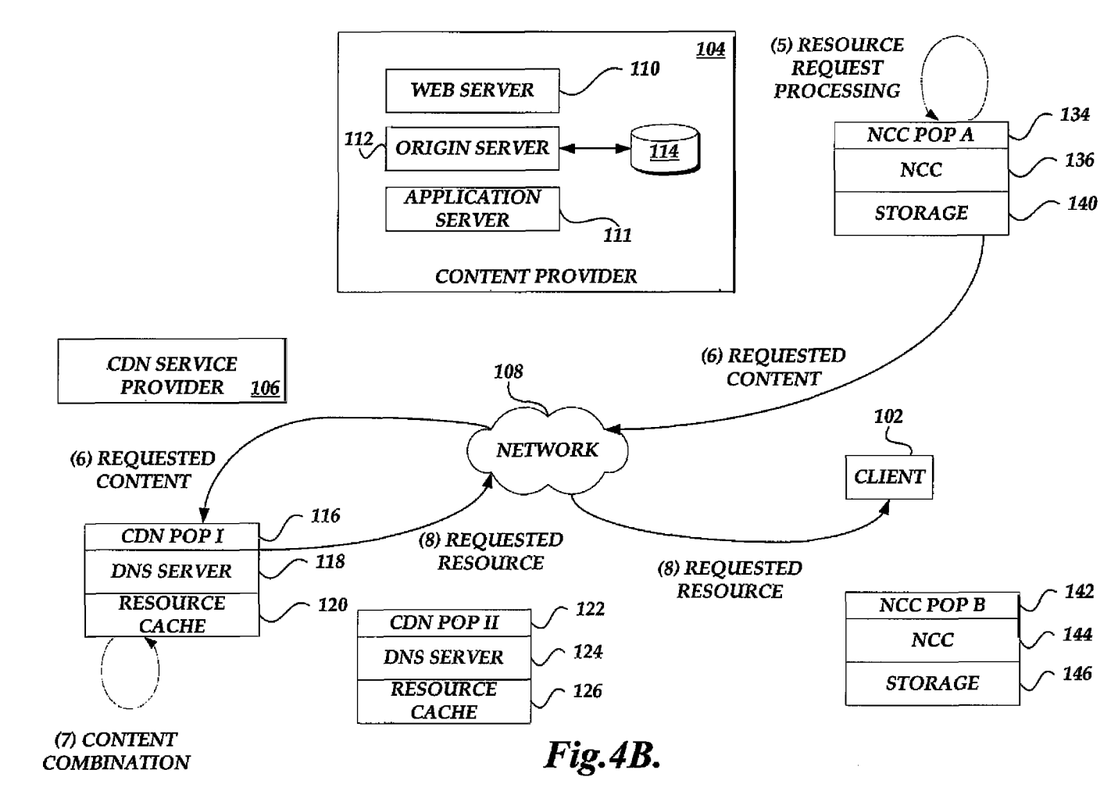

With reference now to FIGS. 2-4, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a CDN POP 116, 122, 128 associated with the CDN service provider 106. In the event that the resource cache component 120, 126, 132 of a selected CDN POP, or the storage component 140, 146, 152 of a subsequently selected instance of an NCC 136, 144, 150 as will be described further below, does not have a copy of a resource requested by a client computing device 102, the resource cache component 120, 126, 132, or the storage component 140, 146, 152, will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, the like. In another embodiment, in addition or alternatively, the additional information can include file type identifiers and/or application identifiers which can include file type information, as well as information pertaining to a type of application for processing the requested content or a specific instance of an application desired for processing the requested content. Application identifiers may also include or be associated with other additional information or requirements for selecting an instance of an application for processing the requested content, such as quality of service criteria which can include information as to compression rates, processing power, processing speed, and/or bandwidth of the NCC, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), generally referred to as a DNS portion of the URL, a name of the resource to be requested (e.g., a video file entitled "resource.mp4") and a path where the resource will be found (e.g., "path"), the path and resource generally referred to as a path portion of the URL. In this illustrative example, the content provider URL has the form of:

http://www.contentprovider.com/path/resource.mp4

During an illustrative translation process, the content provider URL is modified such that requests for the resources associated with the translated URLs resolve to a CDN POP associated with the CDN service provider 106. In one embodiment, the translated URL identifies the domain of the CDN service provider 106 (e.g., "cdnprovider.com"), the same name of the resource to be requested (e.g., "resource.mp4") and a path or combination processing information associated with the requested resource (e.g., "path or combination processing information"). In some embodiments, the translated URL can include additional processing information (e.g., "additional information") in the DNS portion of the URL. The "additional information" portion of the URL can be utilized by the CDN service provider 106 to resolve DNS queries based on information associated with the resource requested. For example, the DNS query may be resolved to a specific POP based on the location of dynamic portion of the requested resource.

Illustratively, the translated URL would have the form of:
http://additional_information.cdnprovider.com/path or combination processing information/resource.mp4

As will be explained in greater detail below, the "path or combination processing information" can be utilized by the CDN service provider 106 to combine requested content that includes shared and unique content. By way of example, the path or combination processing information can be associated with a manifest that includes meta-data regarding the identity of shared content portions, unique content portions and how the shared and unique content portions can be combined. For example, the manifest can include byte offsets or indexing information that can be utilized to interleave unique and shared content portions. In one embodiment, at least a portion of the manifest can be included in the "path or combination processing information." In another embodiment, the "path or combination processing information" can correspond to a pointer or reference (e.g., a code) that can be used to access at least a portion of the manifest information from a network resource.

In another embodiment, the information associated with the CDN service provider 106 is included in a modified URL, such as through prepending or other techniques, such that the translated URL can maintain all of the information associated with the original URL. In this embodiment, the translated URL would have the form of:
http://additional_information.cdnprovider.com/www.contentprovider.com/path or combination information/resource.mp4

With reference now to FIG. 3A, after completion of the registration and translation processes illustrated in FIG. 2, in one embodiment, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers can be generally referred to as original resource identifiers or original URLs.

In one embodiment, upon receipt of the requested content, the client computing device 102, such as through a browser software application, begins processing any of the markup code included in the content and attempts to acquire the resources identified by the embedded resource identifiers. In another embodiment, such as for video or streaming applications, the browser software application may not initiate the request for additional resources until receiving some type of specific request or action from a user associated with the client computing device 102.

In either embodiment, a first process in acquiring the content corresponds to the issuance, by the client computing device 102 (through its local DNS resolver), of a DNS query for the original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

With reference now to FIG. 3B, in an illustrative embodiment, the successful resolution of the "cdnprovider" portion of the resource URL identifies a network address, such as an IP address, of a DNS server associated with the CDN service provider 106. The resolution of a DNS query corresponding to the "cdnprovider" portion of the resource URL can be based on a number of factors, including, but not limited to, the location of the requesting computing device, network topology information, service level agreements, CDN service provider availability information, network availability information, and the like. Additionally, in some embodiments, the "additional information" portion of the translated URL can include one or more identifiers that reference the requested resource. One skilled in the relevant art will appreciate that the resolution of a DNS query associated with a URL does not include the processing of information associated with the requested resource. By including identification information in the "additional information" portion of the translated URL, the CDN service provider 106 can consider additional information in the resolution of DNS queries, including the identity of the requested resource, the identification of shared content portions of a requested resource, the identification of unique content portions of a requested resource and the like. Still further, the CDN service provider 106 may utilize one or more Canonical Name ("CNAME") records in which information regarding the requested resource is included in the CNAMEs returned to the requesting client computing device 102.

Illustratively, the resolution of a DNS query will eventually result in the identification of an IP address of a component associated with the URL. In one embodiment, the IP address can be a specific network address unique to a DNS server component of a POP. In another embodiment, the IP address can be shared by one or more CDN POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP. It will be appreciated by one skilled in the relevant art that a number of ways exist to determine network topology distance.

With continued reference to FIG. 3B, in either of the above identified embodiments (or any other embodiment), a specific DNS server in the DNS component 118 of a CDN POP 116 receives the DNS query corresponding to the original URL from the client computing device 102. Once one of the DNS servers in the DNS component 118 receives the request, the specific DNS server attempts to resolve the request. In one illustrative embodiment as shown in FIG. 3B, a specific DNS server resolves the DNS query by identifying an IP address of a cache server component or an instance of an NCC that will process the request for the requested resource. As described above and as will be described further below in reference to FIGS. 4A and 4B, a selected resource cache component or a storage component associated with an instance of an NCC can process the request by either providing the requested resource if it is available or attempting to obtain the requested resource from another source, such as a peer cache server computing device or the origin server 112 of the content provider 104.

With further reference to FIG. 3B, the specific DNS server can utilize a variety of information in selecting a resource cache component or an instance of an NCC. In one illustrative embodiment, the DNS server can use the additional information in the DNS portion of the resource identifier (which is used to resolve the DNS query by the DNS server) to return an IP address of a resource cache component or an instance of an NCC. As generally described above, the additional information can include, without limitation, client identifiers, such as client identification codes, content provider identifiers, such as content provider identification codes, executable code for processing resource identifiers, such as script-based instructions, and the like. In addition or alternatively, the additional information can include file type identifiers and/or application identifiers which can include file type information, as well as information pertaining to a type of hosted application for processing the requested content or a specific instance of a hosted application desired for processing the requested content.

In some embodiment, the DNS server can also use information obtained directly from a client computing device (such as information provided by the client computing device or ISP) or indirectly (such as inferred through a client computing device's IP address) to select a resource cache component or an instance of an NCC. Such client computing device information can, for example, be geographic information. Still further, the DNS server components can utilize network performance metrics or measurements to assign specific resource cache components or instances of an NCC. The IP address selected by a DNS server component may correspond to a specific caching server in the resource cache or a specific instance of an NCC device. Alternatively, the IP address can correspond to a hardware/software selection component (such as a load balancer) at a specific CDN POP or NCC POP for selecting a specific cache component or instance of an NCC.

Yet still further, for selection of an instance of an NCC, the DNS server components can utilize additional selection information provided from network computing and storage provider 107 to CDN service provider 106. Such selection information can include information typically related to quality of service, such as computing capacity measurements of NCCs, compression rates, processing power, processing speed, bandwidth, and the like, which can be indirectly related to the cost associated with creating and/or using a particular instance of an NCC. This additional selection information can be provided over a communication channel between the network computing and storage provider 107 and CDN service provider 106, as generally illustrated in FIG. 4, at a variety of times. Moreover, as will be appreciated by one skilled in the relevant art, the additional selection information may be transmitted in any of a number of ways, such as upon individual requests from the CDN service provider 106, batch processing initiated by the CDN service provider or network computing and storage provider, and the like.

In further reference to FIG. 4, once an IP address is identified, the DNS server 118 provides the IP address of the resource cache component or the instance of an NCC to the client computing device 102 for further processing, as will be discussed further below in reference to FIGS. 4A and 4B.

With reference now to FIGS. 4A and 4B, in an illustrative example, assume that the DNS server component 130 has selected the resource cache component 120 of POP 116. Upon receipt of the IP address for the resource cache component 120, the client computing device 102 transmits a request for the content to the resource cache component 120, such as in accordance with the HTTP protocol. In one embodiment, the client computing device 102 has been provided executable code, such as a driver, that is executed by the client computing device 102 in order to facilitate the content request. In one embodiment, the client computing device 102 can obtain the executable code as part of the original content request illustrated in FIG. 3A. In another embodiment, the client computing device 102 can separately request the executable code from a provider, such as the CDN service provider 106 or content provider 104. In a further embodiment, the client computing device 102 does not execute any additional executable code and requests the resource as part of processing the original resource or upon receipt of a user request.

In an illustrative embodiment, at least one resource requested by the client computing device 102 includes shared content and unique content. For example, a music file may include audio track information shared by one or more client computing devices 102 as well as album art provided by an individual user. Traditionally, maintaining the combined resource including both the shared content and unique content would require the CDN service provider 106 to maintain the combined resource in accordance with the caching properties of the unique content. Accordingly, a CDN service provider 106 would not typically be able to cache any portion of the resource. In accordance with the present disclosure, however, processing the resource request results in the identification and separate processing of shared content portions and unique content portions of the requested content. Illustratively, the identification and separate processing of the shared content and unique content portions can include the application separate digital rights management criteria, security criteria, caching criteria, encoding, and the like.

As illustrated in FIG. 4A, the resource request is processed at the receiving POP 116. In one aspect, the POP 116 processes the request for the shared content. In one example, the POP 116 can utilize a local resource cache component 120 to provide at least a portion of the shared content portion. In another example, the POP 116 can transmit requests for the shared content portion from a content provider origin server 114 or NCC POP 134, 142, 148. The POP 116 can utilize DRM, location or other information previously identified in the "path or combination information" to identify the one or more shared content portions and to complete the request. Additionally, the POP 116 can utilize additional information provided by the client computing device 102, such as identification information, security information, etc., or provided by another component.

In a separate aspect, the POP 116 processes the request for the unique content. In one example, the POP 116 can transmit requests for the shared content portion from a content provider origin server 114 or NCC POP 134, 142, 148. Similar to the process described with regard to shared content, the POP 116 can utilize DRM, location or other information previously identified in the "path or combination information" to identify the one or more unique content portions and complete the request. Additionally, the POP 116 can utilize additional information provided by the client computing device 102, such as identification information, security information, etc., or provided by another component. As previously described, the POP 116 can utilize separate DRM, security and other information to obtain and process the unique content.

With reference to FIG. 4B, the POP 116 receives the requested shared content (either locally or from a network resource) and the requested unique content (from a network resource). The POP 116 then combines the shared and unique content and provides the combined resource to the requested client computing device 102. Illustratively, the POP 116 can utilize information included in the translated URL or referenced in the translated URL that identifies how the unique and shared portions are interleaved or otherwise combined.

Figure 5:
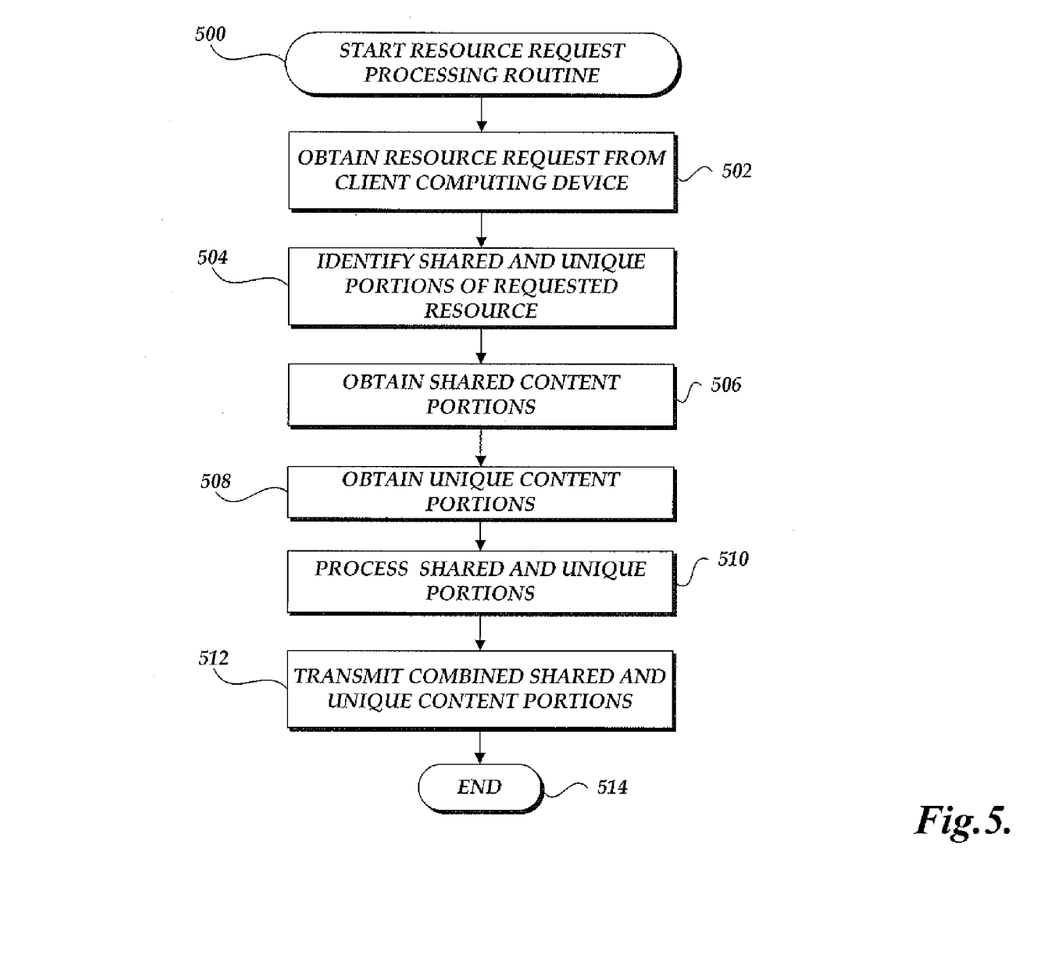
FIG. 5 is a flow diagram illustrative of a request routing routine implemented by a content delivery network service provider for selecting a cache server or network computing component.

Turning now to FIG. 5, a routine 500 for processing resource request including shared and unique content portions will be described. Illustratively, routine 500 may be implemented by one or more components associated with a POP, such as POPS 116, 122, 128. Alternatively, one or more portions of routine 500 may be implemented by executable code provided to a client computing device 102, such as executable code 156. For purposes of illustrating routine 500, however, the routine will be described as implemented by the CDN service provider 106. Such reference should not be construed as limiting. One skilled in the relevant art will appreciate, that additional or alternative components may also implement a portion of the routine 500.

At block 502, the CDN service provider 106 obtains a resource request. In one embodiment, the resource request can be received at a POP associated with a CDN service provider 106. In another embodiment, the resource request is received by executable code being executed at the client computing device 102, such as a software driver. As previously described, the content request can be determined based on the processing, by a client computing device 102, of resource identifiers provided a content provider 104. In another embodiment, the content request can be determined by receipt of a user input, such as selection of Uniform Resource Locator ("URL") or manipulation of controls.

At block 504, the CDN service provider 106 processes the request for the resource to identify shared content portions and unique content portions. Illustratively, the CDN service provider 106 can utilize manifest information included in, or referenced by, the "path or combination information" to identify the one or more shared content portions that will be utilized to provide the requested resource. The manifest information can identify security parameters (e.g., authentication mechanisms, authentication information (e.g., DRM keys), etc.), location, or other information that can be used to identify the location of the shared and unique content portions and retrieve the shared and unique content portions. Additionally, the CDN service provider 106 can utilize additional information provided by the client computing device 102, such as identification information, security information, etc., or provided by another component. As previously described, the CDN service provider 106 can utilize separate DRM, security and other information to obtain and process the unique content.

At block 506, the CDN service provider 106 obtains the shared content portions associated with the requested resource. In one example, the CDN service provider 106 can utilize a local resource cache component 120 to provide at least a portion of the shared content portion. In another example, the CDN service provider 106 can transmit requests for the shared content portion from a content provider origin server 114 or NCC POP 134, 142, 148. In a further example, the executable code being executed on the client computing device 102 can transmit the request directed to the POP to allow the POP to transmit the request to a correspond NCC. Alternatively, the client computing device can transmit the request, or portion thereof, to an appropriate NCC.

At block 508, the CDN service provider 106 obtains the unique content portions associated with the requested resource. In one example, the POP 116 can transmit requests for the shared content portion from a content provider origin server 114 or NCC POP 134, 142, 148. In a further example, the executable code being executed on the client computing device 102 can transmit the request directed to the POP to allow the POP to transmit the request to a correspond NCC. Alternatively, the client computing device can transmit the request, or portion thereof, to an appropriate NCC.

In some embodiments, a request for the identified shared content or unique content portions can result in the identification of additional content that includes additional shared and unique content. In such an embodiment, routine 500 may be implemented recursively in order to obtain the additional shared and unique content.

At block 510, the CDN service provider 106 processes the share content portions and unique content portions to generate the requested resource, also referred to as the combined content. As previously described, the CDN service provider 106 can utilize information included in the "path or combination information" of the URL that specifies how the shared and unique content portions can be interleaved or otherwise combined. At block 512, the CDN service provider 106 transmits the requested resource responsive to the client computing device 102. At block 514, the routine terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for managing content comprising:
as executed by one or more computing devices configured to execute specific instructions,
obtaining a resource request from a client computing device, the resource including shared content and unique content, wherein the shared content can be accessed by two or more users and wherein the unique content is permitted to be accessed by only a single user;
identifying the shared content and the unique content based on information included in a network identifier associated with the resource request, wherein identifying the shared content and unique content includes identifying the shared and unique content by processing executable code on a client computing device;
obtaining the shared content from at least one of a local cache component or a network resource, the shared content associated with at least one security parameter and a caching parameter;
obtaining the unique content from at least one network resource, the unique content associated with at least one security parameter different from the security parameter associated with the shared content;
processing the shared and unique content responsive to the resource request; and
transmitting the processed shared and unique content.

2. The method as recited in claim 1, wherein identifying the shared content and unique content based on information included in a network identifier associated with the resource request includes identifying the shared content and unique content at a network resource.

3. The method as recited in claim 1, wherein the unique content cannot be maintained at a network cache component.

4. A method for managing content comprising:
as executed by one or more computing devices configured to execute specific instructions,
obtaining a resource request from a client computing device, the resource including shared content and unique content, wherein the shared content can be accessed by two or more users, and wherein the unique content is permitted to be accessed by only a single user;
identifying the shared content and unique content, wherein identifying the shared content and unique content includes identifying the shared and unique content by processing executable code on a client computing device;
obtaining the shared content, the shared content associated with at least one security parameter;
obtaining the unique content from at least one network resource, the unique content associated with at least one security parameter different from the security parameter associated with the shared content;
processing the shared and unique content responsive to the resource request; and
transmitting the processed shared and unique content.

5. The method as recited in claim 4, wherein the shared content is associated with a caching parameter.

6. The method as recited in claim 5 further comprising caching at least a portion of the shared content.

7. The method as recited in claim 4, wherein obtaining the shared content includes obtaining the shared content from a local resource cache.

8. The method as recited in claim 4, wherein obtaining the shared content includes obtaining the shared content from a network resource.

9. The method as recited in claim 4, wherein identifying the shared content and unique content includes identifying the shared content based on information included in a network identifier.

10. The method as recited in claim 9, wherein identifying the shared content based on information included in a network identifier includes identifying the shared content and unique content at a network resource.

11. The method as recited in claim 9, wherein identifying the shared content based on information included in a network identifier includes identifying the shared content and unique content at a client computing device.

12. The method as recited in claim 4, wherein the unique content cannot be maintained at a network cache component.

13. The method as recited in claim 4, wherein the share content includes one of a document, video file, or audio file.

14. A system for managing content comprising:
one or more processors, executing computer-readable instructions, that cause one or more computing devices associated with the one or more processors to:
obtain a resource request from a client computing device, the resource including shared content and unique content, wherein the shared content can be accessed by two or more users, and wherein the unique content is permitted to be accessed by only a single user, and wherein the one or more computing devices associated with the one or more processors are associated with executable code on the client computing device;
identify the shared content and unique content based at least partly on information included in a network identifier;
obtain the shared content, the shared content associated with at least one security parameter;
obtain the unique content from at least one network resource, the unique content associated with at least one security parameter different from the security parameter associated with the shared content;
process the shared and unique content responsive to the resource request; and
transmit the processed shared and unique content.

15. The system as recited in claim 14, wherein the shared content is associated with a caching parameter.

16. The system as recited in claim 14, wherein the one or more computing devices associated with the one or more processors are operative to obtain the shared content from a local resource cache.

17. The system as recited in claim 14, wherein the one or more computing devices associated with the one or more processors are operative to obtain the shared content from a network resource.

18. The system as recited in claim 14, wherein identifying the shared content based on information included in a network identifier includes identifying the shared content and unique content at a network resource.

19. The system as recited in claim 14, wherein identifying the shared content based on information included in a network identifier includes identifying the shared content and unique content at a client computing device.

20. The system as recited in claim 14, wherein the unique content cannot be maintained at a network cache component.

21. The system as recited in claim 14, wherein the share content includes one of a document, video file, or audio file.

\* \* \* \* \*